United States Patent

Bauer et al.

[11] Patent Number: 6,136,288
[45] Date of Patent: Oct. 24, 2000

[54] FIRING FINES

[75] Inventors: Ralph Bauer; Thomas Edward Cottringer, both of Niagara Falls, Canada; Martin Bradley Barnes, Ransomville, N.Y.

[73] Assignee: Norton Company, Worcester, Mass.

[21] Appl. No.: 08/167,288

[22] Filed: Dec. 16, 1993

[51] Int. Cl.[7] .............................. C01F 7/30; C04B 35/10
[52] U.S. Cl. .................... 423/625; 423/607; 423/608; 423/622; 501/103; 501/127
[58] Field of Search ..................... 423/625, 608, 423/607, 622; 501/127, 103

[56] References Cited

U.S. PATENT DOCUMENTS

| | | | |
|---|---|---|---|
| 1,712,082 | 5/1929 | Koppers | 241/170 |
| 3,275,405 | 9/1966 | Clark | 423/625 |
| 3,630,501 | 12/1971 | Shabaker | 423/130 |
| 4,141,963 | 2/1979 | Miller | 423/592 |
| 4,166,100 | 8/1979 | Vorobiev et al. | 423/625 |
| 4,314,827 | 2/1982 | Leitheiser et al. | 51/298 |
| 4,623,364 | 11/1986 | Cottringer et al. | 51/309 |
| 4,657,754 | 4/1987 | Bauer et al. | 423/625 |
| 4,744,802 | 5/1988 | Schwabel | 51/309 |
| 4,960,441 | 10/1990 | Pellow et al. | 51/293 |
| 5,011,508 | 4/1991 | Wald et al. | 51/309 |
| 5,139,978 | 8/1992 | Wood | 501/127 |
| 5,284,809 | 2/1994 | Van Dijen | 501/127 |

FOREIGN PATENT DOCUMENTS

| | | | |
|---|---|---|---|
| 281265 | 9/1988 | European Pat. Off. | 423/625 |
| 2033360 | 5/1980 | United Kingdom | 501/127 |

OTHER PUBLICATIONS

Sax, N.I., et al., editors, "Hawley's Condensed Chemical Dictionary, 11th edition". VanNostrand Reinhold, New York (1991), p. 636.

*Primary Examiner*—Steven P. Griffin
*Assistant Examiner*—Peter DiMauro
*Attorney, Agent, or Firm*—David Bennett

[57] ABSTRACT

Fine powders of ceramic materials can be obtained by firing a precursor powder in a rotary kiln while carried on coarse carrier particles.

9 Claims, No Drawings

FIRING FINES

BACKGROUND OF THE INVENTION

This invention relates to fine ceramic powders and particularly the firing of such powders to convert them to a desired high temperature stable phase.

While a ceramic can be fired in an oven or a static kiln, a commercial operation that is continuous is usually preferred. One of the more versatile kilns used to fire ceramic materials is a rotary kiln comprising a long externally heated tube, usually made from a ceramic material such as silicon carbide, that rotates while in use. By changing the angle of inclination of the rotary and the speed of rotation, it is possible to vary the residence time of the material being fired in the kiln. It is also possible to vary the heating in such a way that a limited amount of control can be exercised over the temperature profile along the length of the kiln.

Such rotary kilns are widely used to fire ceramic materials that are produced in the form of particles, such as alpha alumina abrasive grits made by a sol-gel process. In such a process a dried gel of a transitional phase of alumina is fired to convert the transitional phase to the alpha phase, which has the desired abrasive characteristics.

In such a process the material to be fired in the kiln is frequently screened so as to exclude very fine powders. This is because it is found that very fine material tends to accumulate on the inside wall of the tube and not only interfere with free movement of material being fired along the tube but also to create local areas where the temperature is different, leading to thermal stress and ultimately structural failure of the tube.

The difficulties encountered increase with decreasing particle size and in general it is not considered advisable to fire powders of a transition alumina with average particle sizes less than about 65 microns, in a rotary kiln.

This means that such powders, which have many highly valuable applications from polishing slurries to magnetic tapes must be fired in batch furnaces which can require firing times of a day or more if large volumes of relatively non-heat conductive material are involved. Such furnaces need to be carefully regulated since thermal uniformity is necessary to ensure that crystal growth does not occur at local hot-spots. Such thermal variation can also lead to the formation of undesirable amounts of agglomerates. Thus production facilities for such ceramic materials often need to accommodate two different kinds of firing equipment to fire the different particle sizes.

One alternative would be to produce fine powders by firing only large particles and then comminuting the large particles, for example in ball mills, to the desired size. This is often the current procedure of choice but it suffers from the drawback that the very comminution process introduces impurities as a result of erosion of the media performing the comminution. In addition the process can take several days and is very energy intensive.

There is therefore a need for a process for firing a fine powder of a precursor of a ceramic material, such as a transition alumina, in a rotary kiln that does not seriously shorten the useful life of the tube in which the material is fired. The above need is not confined to alumina powders but extends also to other ceramic materials in fine powder form in which a key stage in the production process involves firing a precursor material at an elevated temperature.

DESCRIPTION OF THE INVENTION

The present invention provides a process for firing a precursor of a ceramic material having a particle size smaller than about 65 microns in a rotary kiln which comprises mixing carrier particles of an inert material with the said precursor material, said carrier particles having a particle size of from about 3 to 30 mm., and preferably from about 10 to about 20 mm., in a weight ratio of from about 3:1 to about 15:1, and preferably from about 4:1 to about 10:1.

It is found that the powder particles become coated on the larger carrier particles and are carried along with them as they move through the furnace. At the end of the firing they can be readily removed by washing, shaking or by air blowing the carrier particles.

The carrier particles are inert in the sense that they do not react with the powder particles that they are transporting. It is also desirable that they retain their dimensional and compositional integrity during passage through the rotary kiln and the separation of the fired powder. Most preferably the carrier particles have the same composition as the powder after firing is complete but this is not essential. Thus, for example, transitional aluminas are preferably carried on alpha alumina and unfired zirconia powders are carried on fired zirconia carriers.

The material of the kiln is largely determined by the temperature at which the powder is to be fired. For temperatures up to about 1500° C. a silicon carbide such as Norton Company's "Crystar" silicon carbide, ("Crystar" is a Registered Trademark of Norton Co.), is preferred. Where lower temperatures are involved, other refractory materials such as alumina or mullite can be used or even high temperature metal alloys if the temperature is sufficiently low.

Powders that may be fired using the process of the invention include transition aluminas, zirconia, chromia, zinc oxide and the like. Other powders, both hydrated and anhydrous, may however be fired using this technique.

DETAILED DESCRIPTION OF THE INVENTION

The mixing of the carrier particles with the powder to be fired is preferably carried out immediately before they are fed into the rotary kiln. This is found to minimize the separation of the fine powder from the carrier particles. In a preferred process the carrier and the powder are conveyed by separate screw feeders to the kiln entry port at which point the powder is deposited on the carrier. Other conveying mechanisms such as vibratory or other conventional feeders can be substituted but screw feeders allow precise control over the amounts metered in and are preferred.

The heating of the kiln is conveniently by electrical resistance elements but other mechanisms such as direct flame heating may in some cases be substituted. Electrical heating is preferred because it permits uniform heating at all points on the circumference of the tube and thereby minimizes the possibility of thermal shock.

The rate of passage of the carrier and the powder through the rotary kiln is determined by the temperature to be reached and the exposure time needed to complete the desired transformation. Upon exiting the rotary kiln the material is conveniently deposited on a conventional rotary cooler and thereafter to a suitable screening device to separate the powder. For some materials the cooling must be carefully regulated to avoid deterioration.

The size of the powder particles that can be processed according to the invention is generally below about 65 microns but preferably very much smaller particles, for example down to about 1 or 2 microns, can be processed as described herein. The process is however most suitably adapted to powders of about 5 to about 50, and more preferably from about 10 to about 40 microns average particle size.

The firing is usually performed in air but for some materials it is desirable that the atmosphere be inert, in which case an argon or nitrogen atmosphere can be provided.

DESCRIPTION OF SPECIFIC EMBODIMENTS

The invention is now further described with specific reference to the production of fine alumina powders. It is however to be understood that this implies no essential limitation on the scope of the invention since the process parameters and equipment described can be varied to accommodate other starting materials without departing from the essence of the invention.

The powder feedstock used was dried but unsintered seeded sol-gel alumina produced by the process described in U.S. Pat. No. 4,623,364. The powder was obtained when a dried seeded sol-gel alumina was crushed and graded to separate a fines component. The powder material, which was collected on a dust collector and had an average particle size of about 22 microns, was loaded into a first hopper fitted with a constant volume screw feeder. A second hopper was charged with particles of fused alumina having from about 6 to about 15 mm as their smallest dimension. This second hopper was fitted with a vibratory feeder.

The two feeders were configured so that the product streams converged within about 30 cm. of the entry port of a Harper Model HOU-9078-2RT-28 rotary kiln having an electrically heated silicon carbide tube rotated at 3 revolutions per minute. The angle of inclination of the tube was 2.2 degrees, the diameter of the tube was 25.4 cm. and the length was about 3 m. The flow rate of the powder was 7.73 kg/hr and that of the carrier particles was 61.4 kg/hr. The sintering temperature was 1310° C. and the residence time in the hot zone of the furnace was six minutes.

The hoppers were replenished as needed and the density of the powder produced was measured at intervals over a 39 hour period. It was found that the density, (measured on-line by a water displacement technique), stayed constant at 3.88 g/cm$^3$ during the whole time.

After leaving the kiln, the mixture of carrier and powder was passed to an air cooled steel rotary cooler of conventional design and thereafter to a vibratory separator consisting of a 45 cm diameter screening unit containing two screens, the top being 20 mesh and the bottom being 120 mesh. Rubber balls or metal washers were added to the screens to promote de-agglomeration and passage through the screens. The top screen separated the carrier particles which were then recycled to the feed hopper. The material retained on the second or lower screen was made up of powder agglomerates and fragments of the carrier particles.

The material passing the lower screen was an alpha alumina powder with an average particle size, (measured by scanning electron microscopy), of about 13 microns. It was collected at a yield of about 90% of the theoretical, based on the alumina in the starting powder. The powder grains had many sharp edges and homogeneous surfaces that were reasonably free from cracks and fissures.

Use of a finer powder material as the feedstock would of course yield a finer separated alpha alumina powder at the end of the operation. Thus the invention described is not limited to the firing of powders of the sizes described above. In addition many other variations could be devised without departing from the essential scope of the invention.

What is claimed is:

1. A process for the production of a powdered ceramic material which comprises feeding a mixture comprising carrier particles of an inert material having a particle size of from about 3 to 30 mm and a precursor of the ceramic material in the form of a powder having an average particle size smaller than about 65 microns in a weight ratio of carrier to precursor of from about 3:1 to about 15:1 into a rotary kiln and firing at a temperature sufficient to effect conversion of the precursor to the ceramic material.

2. A process according to claim 1 in which the carrier to precursor ratio is from about 5:1 to 10:1.

3. A process according to claim 1 in which the precursor powder has an average particle size of from about 5 to about 50 microns.

4. A process according to claim 1 in which the carrier particles have an average particle size of from about 6 to about 15 mm.

5. A process according to claim 1 in which the carrier particles are made from the same ceramic material to which the precursor is converted upon firing.

6. A process according to claim 1 in which the carrier and precursor particles are mixed prior to being fed into the rotary kiln.

7. A process according to claim 1 in which the precursor material is a transitional alumina and the ceramic material is alpha alumina.

8. A process for producing alpha alumina in the form of a powder with an average particle size of from about 5 to about 40 microns which comprises feeding a mixture comprising a powder of a transitional alumina with a particle size less than about 65 microns and carrier particles of alpha alumina with an average particle size of from about 6 to 15 mm, in a carrier to powder weight ratio of from 5:1 to about 10:1, into a rotary kiln maintained at a temperature above the conversion temperature of the precursor to alpha alumina and thereafter separating alpha alumina powder from the carrier particles.

9. A process according to claim 8 in which the transitional alumina material is obtained by a seeded sol-gel process.

* * * * *